United States Patent
Schultz et al.

(10) Patent No.: US 6,927,314 B1
(45) Date of Patent: Aug. 9, 2005

(54) FRACTIONATION AND TREATMENT OF FULL BOILING RANGE GASOLINE

(75) Inventors: Michael A. Schultz, Chicago, IL (US); Joseph A. Weiszmann, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 245 days.

(21) Appl. No.: 10/198,196

(22) Filed: Jul. 17, 2002

(51) Int. Cl.$^7$ .............................................. C07C 5/13
(52) U.S. Cl. ...................................... 585/734; 585/737
(58) Field of Search ................................ 585/734, 737

(56) References Cited

U.S. PATENT DOCUMENTS

| | | | |
|---|---|---|---|
| 2,471,134 A | 5/1949 | Wright | 196/100 |
| 4,230,533 A | 10/1980 | Giroux | 203/1 |
| 5,755,933 A | 5/1998 | Ognisty et al. | 202/158 |
| 6,395,950 B1 | 5/2002 | Rice | 585/738 |
| 6,407,303 B1 | 6/2002 | O'Brien et al. | 585/738 |

OTHER PUBLICATIONS

Rudd, H. "Thermal Coupling for Energy Efficiency" *Supplement to The Chemical Engineer* p. s14–s15 Aug. 27, 1992.

*Primary Examiner*—Thuan D Dang
(74) *Attorney, Agent, or Firm*—John G. Tolomei; Frank S. Molinaro; Maryann Maas

(57) ABSTRACT

A process to increase the octane number of a naphtha boiling range feed stock has been developed. Using a dividing wall column, the feed stock is separated into a light fraction comprising compounds containing five carbon atoms or less, an intermediate fraction containing largely compounds having six carbon atoms, and a heavy fraction which comprises compounds containing more than six carbon atoms. The light and heavy fractions are passes to a gasoline blending pool. The intermediate fraction is isomerized to increase the octane number of the intermediate fraction and form an isomerate. The isomerate is passed to the gasoline bending pool.

7 Claims, 1 Drawing Sheet

US 6,927,314 B1

FRACTIONATION AND TREATMENT OF FULL BOILING RANGE GASOLINE

FIELD OF THE INVENTION

The invention is a process for the fractional distillation of naphtha or gasoline boiling range hydrocarbon fraction to separate an intermediate containing largely hydrocarbons having six carbon atoms which is isomerized to increase the octane number. The intermediate stream is isomerized to increase the octane number of hydrocarbons having six carbon atoms. The invention specifically relates to the use of a dividing wall distillation column to separate a naphtha upstream of an isomerization unit.

BACKGROUND OF THE INVENTION

The naphtha boiling range hydrocarbons sold commercially as gasoline are normally a blend of several streams produced in a petroleum refinery. These include reformates and alkylates which are relatively sulfur free because of upstream refining. Another major source of the naphtha boiling range hydrocarbons are processing units which do not receive a highly desulfurized feed. These include hydrocracking units, coking units and fluidized catalytic cracking (FCC) process units. A perpetual goal of the refining industry is to increase octane of its products. The present invention discloses a process for increasing the octane of naphtha boiling range hydrocarbons by separating the hydrocarbons and isomerizing those that may be readily isomerized into high octane products.

The dividing wall or Petlyuk configuration for fractionation columns was initially introduced some 50 years ago by Petlyuk et al. Dividing wall columns have been employed for the separation of hydrocarbon mixtures as evidenced by the disclosure of U.S. Pat. No. 2,471,134. It has been recognized that in specific circumstances the use of dividing wall columns is desirable over conventional fractionation columns. For instance, a commercialization of a fractionation column employing this technique is described in the article appearing at page s14 of a supplement to The Chemical Engineer, 27 Aug. 1992.

U.S. Pat. No. 2,471,134 illustrates a dividing wall fractionation column having a partition or dividing wall 20 dividing the trayed column into two parallel vapor-liquid contacting chambers. A similar but more detailed disclosure of a dividing wall fractionation column is provided by U.S. Pat. No. 4,230,533. Dividing wall columns are closely related to a different type of column referred to as a partitioned distillation column such as illustrated in U.S. Pat. No. 5,755,933. A partitioned distillation column differs from a dividing wall column in that the vertical dividing wall is positioned such that it contacts one end of the column. Thus only one terminal portion of the column is divided into the two parallel contacting sections. In this manner two overhead products or two bottom products may be removed from a single column. A dividing wall column produces an intermediate boiling fraction.

SUMMARY OF THE INVENTION

It has been discovered that a significant improvement can be achieved in the overall octane number of a pool of FCC gasoline when the naphtha boiling range feedstock is first fractionated and the compounds containing six carbon atoms isomerized to high octane compounds before being included in the gasoline pool. The fractionation of a full boiling range gasoline is accomplished by employing a dividing wall column.

A first embodiment of the invention may be characterized as a process for the separation of a naphtha boiling range feed stock by passing the feedstock into a dividing wall column and separating the feed stock into a light fraction comprising compounds containing five carbon atoms or less, an intermediate fraction containing largely compounds having six carbon atoms, and a heavy fraction which comprises compounds containing more than six carbon atoms. The light fraction and the heavy fraction are passed to a gasoline blending pool. The intermediate fraction is reacted in an isomerization zone to increase the octane number of the intermediate fraction and form an isomerate. The isomerate is passed to the gasoline blending pool.

BRIEF DESCRIPTION OF THE DRAWINGS

The drawings are simplified process flow diagrams showing the fractionation of a full boiling range FCC gasoline into light, heavy and intermediate boiling range fractions using in a variety of configurations. The intermediate fraction is passed to an isomerization zone to form an isomerate of increased octane number as compared to the intermediate fraction. The isomerate is then included in the gasoline pool.

DETAILED DESCRIPTION OF THE INVENTION

Figure 1:
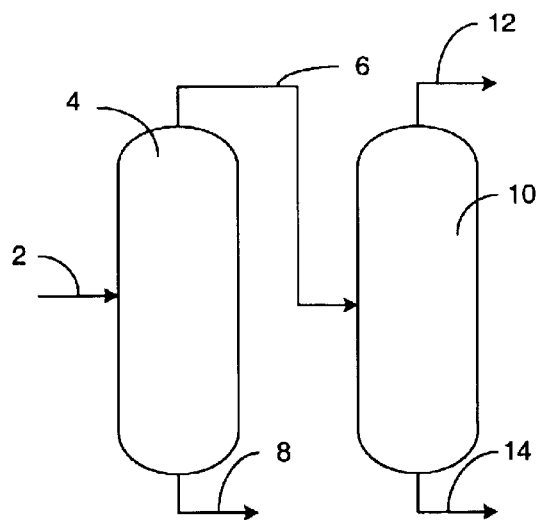
FIG. 1 shows a process flow diagram of a two stage indirect sequence fractionation of the full boiling range FCC gasoline.

The feed stream or streams to the subject process are naphtha boiling range petroleum fractions such as FCC gasoline, coker naphtha, straight run gasoline and naphtha fractions from conversion processes such as hydrocracking or thermal cracking. These gasoline blending component streams will normally have a boiling range, as determined by the appropriate ASTM test method, falling between about 100 and 500° F. (38–260° C.), which encompasses the range of boiling points for modern gasoline. The individual feeds may include a light naphtha having a boiling point range of from that of $C_6$ to about 204° C. (400° F.), full range naphtha having a boiling point range from about that of $C_5$ hydrocarbons to about 249° C. (480° F.) and heavy naphtha boiling fraction distilling in the range of from about 126° C. to about 249° C. (about 260° F. to about 480° F.).

It is ever a goal in refining, to increase the octane of process streams to result in a more valuable product. The present invention provides a process flow to increase the octane of a stream destined for a gasoline blending pool by separating a portion that is readily isomerizable to higher octane products. The separation results in three streams, a lighter stream, an intermediate stream and a heavy stream. The lighter stream and the heavy stream may be optionally treated to remove sulfur and then are directed to a gasoline pool. The intermediate stream may also be optionally treated to remove sulfur, and then is passed to an isomerization zone to convert low octane components into higher octane, more valuable, components. The higher octane isomerate may then be passed to the gasoline pool. Not only does the invention provide a flowscheme for increasing the octane of a stream, but the invention also provides a particular fractionation design that is surprisingly efficient from both a fixed cost perspective as well as a utilities perspective.

The invention will be explained in detail as a preferred embodiment where the feed is a light naphtha containing approximately 27 mass % $C_5$ hydrocarbons, 26 mass % $C_6$ hydrocarbons and 47 mass % $C_7$+hydrocarbons. It is to be understood however, that other naphthas having different ranges of components may also be separated according to the present invention, and the octane of the overall result be enhanced. In the preferred embodiment, the light naphtha is an FCC gasoline.

Out of all the components of the FCC gasoline, those that can provide the greatest increase in octane number include primarily the $C_6$ components. The expected $C_5$ components are largely multi-methyl branched and isopentane, very little normal pentane is typically present. Therefore, isomerizing the $C_5$ components typically found would not increase the octane number and in fact may decrease the octane number by isomerizing some of the high octane components to lower octane components. The $C_5$ components of the FCC gasoline typically have an octane number of about 93 to about 96 already, and isomerizing the $C_5$ component fraction may actually decrease the octane number to about 91. In comparison, the $C_6$ components are largely normal and mono-methyl banched hydrocarbons which have lower octane numbers, such as around 50 to around 70 octane number. After isomerization to form multi-methyl branched $C_6$ hydrocarbons, the octane number may be increased from around 60 to around 91. This is a sizeable increase in octane number for this fraction of the FCC gasoline. As to the $C_7$+fraction of the FCC gasoline, most isomerization processes successful for the isomerization of $C_6$ portion, have a tendency to crack larger carbon number hydrocarbons. The cracked product has a lesser value and it is therefore not desirable to isomerize the $C_7$+fraction using the same isomerization system as for the $C_6$ fraction. Also, some gasoline yield loss may occur due to the cracking forming lighter products.

Therefore, it is a goal of the present invention to separate the $C_6$ components from the rest of the FCC gasoline so that the $C_6$ fraction may be isomerized into higher octane components. The challenge lies in the fact that the $C_6$ components are found in the middle of the complete boiling point range of the FCC gasoline. Accordingly, three streams must be separated, a lighter stream containing those components boiling lower than the $C_6$ components, an intermediate stream containing the $C_6$ components, and a heavy stream containing those components boiling higher than the $C_6$ components.

Several different flowschemes were investigated and are shown in FIGS. 1–4. The results of theoretical modeling of a feedstock using each of the different flowschemes are shown in TABLE 1. The objective of the separation was to separate the $C_6$ components from the $C_5$ and $C_7$ components without excessive amounts of the $C_6$ in the light fraction, $C_5$ and $C_7$ in the intermediate fraction and $C_6$ in the heavy fraction. In an effort to make the designs comparable, all the flowschemes have about 70 separatory stages and the degree of separation between the fraction was similar among the different flowschemes. The first flowscheme as shown in FIG. 1 is an indirect sequence of two fractionation columns. The feedstock containing the mixture of $C_5$–$C_7$ components in line 2 enters the first fractionation column 4 which is operated at about 42° C. (107° F.) and 103 KPaa (15 psia), measured at the overhead receiver, in order to separate a light fraction into line 6 and a heavy fraction into line 8. The light fraction in line 6 contains largely $C_5$ and $C_6$ components while the heavy fraction in line 8 contains largely $C_7$ components. The heavy fraction in line 8 would be conducted to the gasoline blending pool while the light fraction in line 6 would be conducted to the second fractionation column 10. Second fraction columns 10 would be operated at a temperature of about 39° C. (102° F.) and a pressure of about 138 KPaa (20 psia), measured at the overhead receiver, in order to separate a second light fraction into line 12 and a second heavy fraction into line 14. The second light fraction in line 12 would contain largely $C_5$ components and the second heavy fraction in line 14 would contain largely $C_6$ components. The second light fraction would be directed to the gasoline blending pool, and the second heavy fraction would be directed to an isomerization unit to convert normal or mono-methyl-branched $C_6$ components into higher octane number components. Optionally, any of the fractions may be treated to remove sulfur using any known sulfur removal techniques.

As can be seen in Table 1, the results of the indirect sequence approach of FIG. 1. are that minimal $C_6$ components are found in the second light fraction, minimal $C_5$ and $C_7$ components are found in the second heavy fraction, and minimal $C_6$ components are found in the first heavy fraction.

Figure 2:
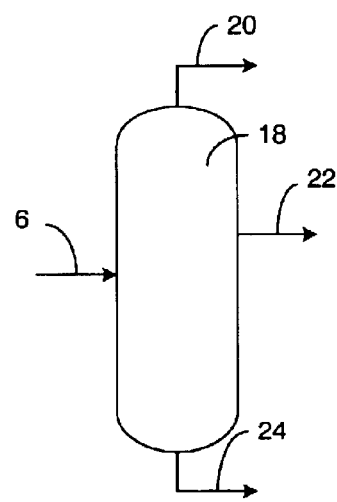
FIG. 2 shows a process flow diagram of a single fractionation column having a side draw for the intermediate fraction.

The second flowscheme is shown in FIG. 2 and is a single side-draw fractionation column. The feedstock containing the mixture of $C_5$–$C_7$ components in line 16 enters the side-draw fractionation column 18 which is operated at about 30° C. (87° F.) and 103 KPaa (15 psia), measured at the overhead receiver, in order to separate a light fraction into line 10, an intermediate fraction into line 22, and a heavy fraction into line 24. The light fraction in line 20 contains largely $C_5$ components, the intermediate fraction in line 22 contains largely $C_6$ components, and the heavy fraction in line 24 contains largely $C_7$ components. The light fraction in line 20 and the heavy fraction in line 24 would be conducted to the gasoline blending pool while the intermediate fraction in line 22 would be directed to an isomerization unit to convert normal or mono-methyl-branched $C_6$ components into higher octane number components. Optionally, any of the fractions may be treated to remove sulfur using any known sulfur removal techniques.

As can be seen in Table 1, the single side-draw fraction column approach of FIG. 2 was modeled at two different sets of column diameters and reboiler duties. With the smaller diameter column, 11.5 feet, the reboiler duty was reasonable, but more than a minimal amount of $C_5$s were found in the intermediate fraction. To reduce the amount of $C_5$ components in the intermediate fraction as desired, larger reboiler duty was needed which lead to a larger diameter column, 21 feet. However, modeling the larger diameter column, showed the reboiler duty increased dramatically, and the capital cost of the larger diameter column was increased significantly.

Figure 3:
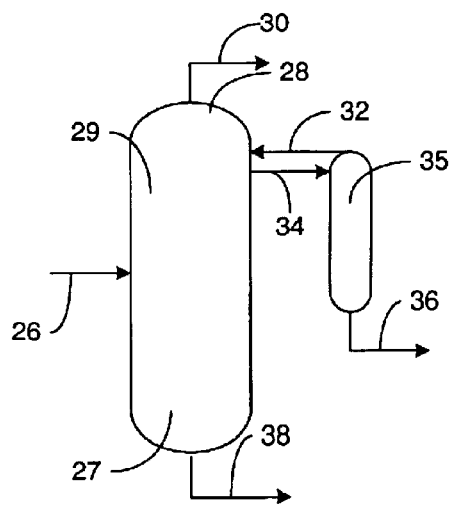
FIG. 3 shows a process flow diagram of a side-stripper fraction column to generate the intermediate fraction.

The third flowscheme is shown in FIG. 3 and is a side-stripper fractionation system. The feedstock containing the mixture of $C_5$–$C_7$ components in line 26 enters the main fractionation column 28 having a stripping section 27 and a rectification section 29. Main fractionation column 28 is operated at about 30° C. (87° F.) and 103 KPa a (15 psia), measured at the overhead receiver, in order to separate a light fraction into line 30 and a heavy fraction into line 38. The light fraction in line 20 contains largely $C_5$ components and the heavy fraction in line 24 contains largely $C_7$ components. To separate an intermediate stream containing largely $C_6$ components a side-stripper column is used. Stream 34 is removed from the rectification section 29 of fractionation column 28 and introduced to side-stripper 35. The side-stripper is operated at about 68° C. (154° F.) and 152 KPaa (22 psia), measured at the overhead, in order to further separate $C_5$ components from $C_6$ components. The $C_5$ components are returned to the main fractionation column 28 via line 32. The returned $C_5$ components are removed from main fractionation column in line 30 as discussed above. The $C_6$ components are removed from side-stripper 35 in an intermediate fraction via 36. The light fraction in line 30 and the heavy fraction in line 38 from main fractionation column 28 would be conducted to the gasoline blending pool. The intermediate fraction in line 36 would be directed to an isomerization unit to convert normal or mono-methyl-branched $C_6$ components into higher octane number components. Optionally, any of the fractions may be treated to remove sulfur using any known sulfur removal techniques.

As can be seen in Table 1, the results of the side-stripper column approach of FIG. 3 are that minimal $C_6$ components are found in the second light fraction, minimal $C_5$ and $C_7$ components are found in the second heavy fraction, and minimal $C_6$ components are found in the first heavy fraction. The drawbacks include the additional capital cost of the side-stripper and the additional utilities in operating the side stripper.

Figure 4:
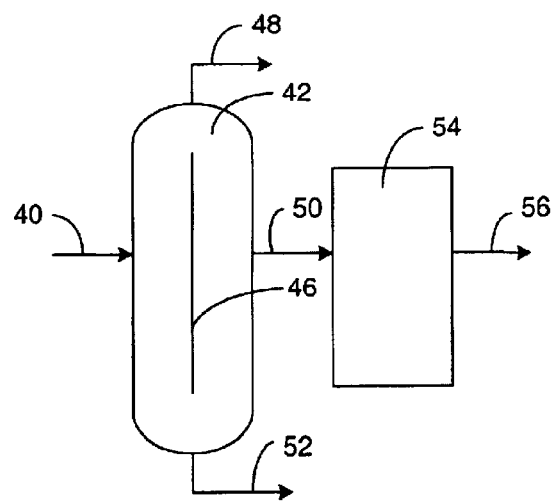
FIG. 4 shows a process flow diagram of the dividing wall column of the present invention where the intermediate fraction of the dividing wall column is passed to an isomerization unit before being added to the gasoline pool.

The present invention is shown in FIG. 4 as a dividing wall column. The feedstock containing the mixture of $C_5$ through $C_7$-plus components in line 40 enters the dividing wall main fractionation column 42. The depiction of the column is simplified as all the auxiliary operational components, such as controls, trays, condenser and reboiler, may be of conventional design. In other embodiments, different feed streams can be fed into the column at different locations if appropriate. The dividing wall column is distinguished from tradition fractional columns by the presence of a vertical dividing wall 46 in a vertical mid portion of the column, also referred to as the dividing wall portion of the column. This dividing wall extends between opposing sides of the inner surface of the column and joins it in a substantially fluid tight seal. Thus fluids cannot pass horizontally from one side of the column to the other and must instead travel either over or under the wall. The dividing wall divides the central portion of the column into two parallel fractionation zones or chambers, which may be of different cross-section. Each chamber, and the rest of the column, will contain conventional vapor liquid contacting equipment such as trays or packing. The type of tray and design details such as tray type, tray spacing and layout may vary within the column and between the two parallel chambers of the dividing wall portion of the column.

The dividing wall column separates all of the entering naphtha boiling range hydrocarbons into an overhead stream containing all of the compounds having boiling points less than the $C_6$ hydrocarbons, an intermediate side cut stream containing $C_6$ hydrocarbons, and a bottoms stream containing the heavier $C_7$ plus compounds. As with any fractional distillation there will be some overlap and tailing of compositions between the three cuts. The feed rate is 100 m³/h (15,100 BPSD). The reboiler duty is 29.4 MM BTU/hr., and the recovery of $C_6$ hydrocarbons in the intermediate stream equals 93 percent of the $C_6$ hydrocarbons in the feed. The intermediate stream has a flow rate of 27 m³/h (4100 BPSD). The temperature and pressure of the dividing wall column are 30° C. (87° F.) and 103 KPaa (15 Psia), measured at the overhead receiver.

The intermediate stream of line 50 will comprise $C_6$ normal and branched hydrocarbons including both olefins and paraffins. It is preferably passed via line 50 into an isomerization zone 54 in which the intermediate stream is preferably contacted with an isomerization catalyst under conditions at which effect the isomerization of the lower octane number components into higher octane number components. The light fraction is removed as an overhead stream comprising light hydrocarbons such as butane, pentane, and some $C_6$ hydrocarbons via line 48. The heavy fraction produced in column 42 comprises $C_7$ and heavier hydrocarbons and is withdrawn via line 52. The light fraction in line 48 and the heavy fraction in line 52 from main fractionation column 42 would be conducted to the gasoline blending pool.

The hydrocarbon components in the intermediate stream are susceptible to octane improvement by further processing through the isomerization zone. Hydrogen may be mixed with the intermediate stream from the dividing wall fractionation column in an amount that will provide a hydrogen to hydrocarbon molar ratio of from 0.01 to 10 in the effluent from the isomerization zone. Preferably, the hydrogen to hydrocarbon molar ratio is in the range of 0.05 to 5. Alternatively, hydrogen may be introduced directly to the isomerization zone. The hydrogen may be recycled to the isomerization zone or removed. Although no net hydrogen is consumed in the isomerization reaction, the isomerization zone will have a net consumption of hydrogen often referred to as the stoichiometric hydrogen requirement that is associated with a number of side reactions that occur. These side reactions include saturation of olefins and aromatics, cracking and disproportionation. For streams having a high level of unsaturates, satisfying the stoichiometric hydrogen will require a higher hydrogen to hydrocarbon molar ratio for the feed at the inlet of the isomerization zone. Hydrogen in excess of the stoichiometric amounts for the side reactions is often maintained in the reaction zone to provide stability and conversion by compensating for variation in feed stream compositions that alter the stoichiometric hydrogen requirements. Higher hydrogen to hydrocarbon molar ratios are often used to prolong catalyst life by suppressing side reactions such as cracking and disproportionation. When such side reactions occur, they can reduce conversion and lead to formation of carbonaceous compounds, usually referred to as coke, that foul the catalyst.

The intermediate stream from the dividing wall fractionation column is contacted in the isomerization zone with an isomerization catalyst. The isomerization catalyst may be any of those commonly known in the art including traditional isomerization catalysts. Such catalysts include high chloride catalyst on an alumina base containing platinum, and crystalline aluminosilicates or crystalline zeolites. Suitable catalyst compositions of this type will exhibit selective and substantial isomerization activity under the operating conditions of the process.

The preferred isomerization catalyst for this invention is a chlorided platinum alumina catalyst. The aluminum is preferably an anhydrous gamma-alumina with a high degree of purity. The catalyst may also contain other platinum group metals. The term platinum group metals refers to noble metals excluding silver and gold which are selected from the group consisting of platinum, palladium, ruthenium, rhodium, osmium, and iridium. These metals demonstrate differences in activity and selectivity such that platinum has now been found to be the most suitable for this process. The catalyst will contain from about 0.1 to 0.25 wt. % of the platinum. Other platinum group metals may be present in a concentration of from 0.1 to 0.25 wt. %. The platinum component may exist within the final catalytic composite as an oxide or halide or as an elemental metal. The presence of the platinum component in its reduced state has been found most suitable for this process. The chloride component termed in the art as "a combined chloride" is present in an amount from about 2 to about 10 wt. % based upon the dry support material. The use of chloride in amounts greater than 5 wt. % have been found to be the most beneficial for this process. The inorganic oxide preferably comprises alumina and more preferably gamma-alumina, eta-alumina, and mixtures thereof.

It is generally known that high chlorided platinum-alumina catalysts of this type are highly sensitive to sulfur and oxygen-containing compounds. Therefore, the use of such catalysts requires that the streams introduced to the isomerization zone should be relatively free of such compounds. A sulfur concentration no greater than 0.5 ppm is generally required. The presence of sulfur in the stream serves to temporarily deactivate the catalyst by platinum poisoning. Activity of the catalyst may be restored by hot hydrogen stripping of sulfur from the catalyst composite or by lowering the sulfur concentration in the incoming stream to below 0.5 ppm so that the hydrocarbon will desorb the sulfur that has been adsorbed on the catalyst. Water can act to permanently deactivate the catalyst by removing high activity chloride from the catalyst and replacing it with inactive aluminum hydroxide. Therefore, water, as well as oxygenates, in particular $C_1$–$C_5$ oxygenates, that can decompose to form water, can only be tolerated in very low concentrations. In general, this requires a limitation of oxygenates in the feed to about 0.1 ppm or less. The extract from the adsorption zone, or the feed stream to the splitter column may be treated by any method that will remove water and sulfur compounds. Sulfur may be removed from the feed stream by hydrotreating. A variety of commercial dryers are available to remove water from the feed components. Adsorption processes for the removal of sulfur and water from hydrocarbon streams are also well known to those skilled in the art.

As a class, the crystalline aluminosilicate or crystalline zeolite catalysts comprise crystalline zeolitic molecular sieves having an apparent pore diameter large enough to adsorb neopentane. A silica alumina molar ratio $SiO_2:Al_2O_3$ of greater than 3; less than 60 and preferably between 15 and 30 is desirable. In preferred form, the zeolite will contain an equivalent percentage of alkali metal cations and will have those $AlO_4$-tetrahedra not associated with alkali metal cations, either not associated with any metal cations or associated with divalent or other polyvalent metal cations. Usually the molecular sieve is a mordenite molecular sieve, which is essentially in the acid form or is converted to the acid form. Particularly preferred catalysts of this type for isomerization are disclosed in detail in U.S. Pat. No. 3,442, 794 and U.S. Pat. No. 3,836,597.

A preferred composition of zeolitic catalyst for use in the present invention comprises a Group VIII noble metal, a hydrogen form crystalline aluminosilicate, and a refractory inorganic oxide with the catalyst composition having a surface area of at least 580 $m^2$/g. Significant improvements in isomerization performance are realized when the surface area of the catalytic composite is at or above 580 $m^2$/g. A Group VIII metal is incorporated into the catalytic composite to supply a hydrogenation/dehydrogenation function and the preferred Group VIII noble metal is platinum. The Group VIII noble metal is present in an amount from about 0.01 to 5% by weight of the composite and preferably in an amount of at least 0.15% by weight but not over 0.35% by weight. The zeolitic catalytic composite may also contain a catalytically effective amount of a promoter metal such as tin, lead, germanium, cobalt, nickel, iron, tungsten, chromium, molybdenum, bismuth, indium, gallium, cadmium, zinc, uranium, copper, silver, gold, tantalum, or one or more of rare earth metals and mixtures thereof. The hydrogen-formed silica alumina has either a three-dimensional or channel pore structure crystal lattice framework. The three-dimensional aluminosilicates include both synthetic and naturally occurring silica aluminas such as faujasites, which include X-type, Y-type, ultrastable-Y, and the like. L-type, omega-type, and mordenite are examples of the channel pore structure crystalline aluminosilicates. Mordenite, in either naturally occurring or synthetic form are preferred, particularly with a silica to alumina ratio of at least 16:1. The hydrogen form aluminosilicate may be present in an amount within the range of 50 to about 99.5 wt. %, preferably within the range of 75 to about 95 wt. %, and a refractory inorganic oxide may be present in an amount within the range of from 25 to about 50 wt. %.

Operating conditions within the isomerization zone are selected to maximize the production of isoalkane product from the normal hexane and normal pentane components. Temperatures within the reaction zone will usually range from about 40–320° C. (100–600° F.). Lower reaction temperatures are generally preferred since they usually favor equilibrium mixtures of isoparaffins versus normal paraffins. Lower temperatures are particularly useful in processing feeds composed of pentanes and hexanes where the lower temperatures favor equilibrium mixtures having the highest concentration of the most branched isoalkanes. When the stream entering the isomerization zone contains primarily pentanes and hexanes, temperatures in the range of from 60 to 160° C. are preferred. Higher reaction temperatures increase catalyst activity and promote the isomerization of $C_4$ hydrocarbons. The reaction zone may be maintained over a wide range of pressures. Pressure conditions in the isomerization of $C_4$–$C_6$ paraffins range from 700 to 7000 KPag. Preferred pressures for this process are in the range of from 2000 to 3000 KPag. The feed rate to the reaction zone can also vary over a wide range. These conditions include liquid hourly space velocities ranging from 0.5 to 12 $hr^{-1}$, however, space velocities between 1 and 6 $hr^{-1}$ are preferred. The isomerization zone will usually operate at a LHSV of about 1.5.

Operation of the reaction zone with the preferred chlorided platinum-alumina catalyst also requires the presence of a small amount of an organic chloride promoter. The organic chloride promoter serves to maintain a high level of active chloride on the catalyst as low levels are continuously stripped off the catalyst by the hydrocarbon feed. The concentration of promoter in the reaction zone is maintained at from 30 to 300 ppm. The preferred promoter compound is trichloroethane. Other suitable promoter compounds include oxygen-free decomposable organic chlorides such as propyldichloride, butylchloride, and chloroform to name only a few of such compounds. The need to keep the reactants dry is reinforced by the presence of the organic chloride compound that converts to hydrogen chloride. As long as the process streams are kept dry, there will be no adverse effect from the presence of hydrogen chloride.

The isomerization zone usually includes a two-reactor system with a first stage reactor and a second stage reactor in the reaction zone. The catalyst used in the process is distributed equally between the two reactors. It is not necessary that the reaction is carried out in two reactors but the use of two reactors confers several benefits on the process. The use of two reactors and specialized valving allows partial replacement of the catalyst system without taking the isomerization unit off stream. For the short periods of time during which replacement of catalyst may be necessary, the entire flow of reactants may be processed through only one reaction vessel while catalyst is replaced in the other. The use of two reaction zones also aids in maintaining lower catalyst temperatures. This is accomplished by having any exothermic reaction such as hydrogenation of unsaturates performed in a first reaction vessel with the rest of the reaction carried out in a final reaction vessel at more favorable temperature conditions.

The theoretical modeling results shown in Table 1 indicate that the separation performed in the present invention would compare well with that achieved in the three comparative flowschemes of FIGS. 1–3, where each of the flowschemes (FIGS. 1–4) had approximately the same number of separatory stages (about 70). However, the present invention would be able to accomplish the sane results using only one column, which had a significantly reduced column diameter, leading to lower capital costs. Consequently, the duty from the reboilers would also be reduced leading to lower operating costs. In addition to the dividing wall column of the present invention providing reduced capital and utilities costs, another advantage provided by the use of a dividing wall column is that the composition of the intermediate fraction can be controlled more precisely. A properly designed and operated dividing wall column will allow for a sharper separation between the streams being fractionated, while reducing capital cost, plot space requirements, and energy cost compared to a sequence of two distillation columns, a side-draw column, or a side-stripper column.

This novel process may be characterized as a process for the separation of a naphtha boiling range feed stock, which process comprises passing the feedstock into a dividing wall column and separating the feed stock into a light fraction comprising hydrocarbons having less than six carbon atoms, an intermediate fraction comprising $C_6$ hydrocarbons, and a heavy fraction which comprises hydrocarbons containing more than seven carbon atoms per molecule; passing the light fraction and the heavy fraction to a gasoline blending pool, and passing the intermediate fraction to an isomerization zone, in which lower octane number compounds are converted into higher octane number compounds. The effluent from the isomerization zone may be passed to the gasoline blending pool.

comprises compounds containing more than six carbon atoms, wherein at least a portion of the feedstock is selected from the group consisting of FCC gasoline, coker naphtha, straight run gasoline, naptha fraction from a hydrocracking process, naphtha fraction from a thermal cracking process and mixtures thereof;

b) passing the light fraction to a gasoline blending pool;

c) treating the intermediate fraction in an isomerization zone to increase the octane number of the intermediate fraction and form an isomerate;

d) passing the heavy fraction to the gasoline blending pool; and, e) passing the isomerate to the gasoline bending pool.

2. The process of claim 1 wherein the intermediate fraction contains no more than about three volume percent compounds having five or less carbon atoms, and no more than about eight volume percent compounds having seven or greater carbon atoms.

3. The process of claim 1 wherein the light fraction contains no more than about 3 vol % of compounds having six or more carbon atoms.

4. The process of claim 1 wherein the heavy fraction contains no more than about 2 vol % compounds having six or less carbon atoms.

5. The process of claim 1 wherein the isomerization zone contains an isomerization catalyst and is operated at conditions effective for the isomerization of the intermediate fraction.

6. The process of claim 1 wherein the isomerization zone contains an isomerizatior catalyst comprising alumina having from 0.01 to 0.25 wt.% platinum and from 2 to 10 wt.% of a chloride component.

7. In a process for the separation of an FCC naphtha fraction wherein the FCC naphtha fraction is separated by fractional distillation yielding at least light and heavy fractions, the improvement comprises performing the fractional distillation in a dividing wall column and producing a light fraction comprising compounds containing five carbon atoms or less, an intermediate fraction containing largely compounds having six carbon atoms, and a heavy fraction

TABLE 1

|  | FIG. 1 | | FIG. 2 | | FIG. 3 | | FIG. 4 |
|---|---|---|---|---|---|---|---|
|  | Col. 1 | Col. 2 | Case 1 | Case 2 | Main Col. | Side Stripper |  |
| No. of Stages | 40 | 28 | 70 | 70 | 65 | 5 | 70 |
| Reboil Q MW/hr (MMBTU/hr) | 8.9 (30.35) | 5.2 (17.7) | 14.7 (50) | 46.9 (160) | 8.6 (29.5) | 1.9 (6.4) | 8.6 (29.4) |
| Reboil Temperature ° C. (° F.) | 132 (270) | 88 (190) | 134 (273) | 134 (273) | 141 (286) | 83 (181) | 140 (283) |
| Column Diameter m (ft) | 2.7 (9) | 2.1 (7) | 3.5 (11.5) | 6.4 (21) | 3.2 (10.5) | 1.8 (4.5) | 2.7 (9) |
| $C_6$ in light fraction, vol. % | 3 |  | 3 | 3 | 3 |  | 3 |
| $C_5$ in intermediate fraction, vol. % | 3 |  | 9.7 | 3 | 3 |  | 3 |
| $C_7$ in intermediate fraction, vol. % | 8 |  | 6.3 | 6.7 | 8 |  | 8 |
| $C_6$ in heavy fraction, vol. % | 2 |  | 2 | 2 | 2 |  | 2 |

What is claimed is:

1. A process for the separation and treatment of a naphtha boiling range feed stock comprising compounds containing from five to seven carbon atoms, said process comprising a) passing the feedstock into a dividing wall column and separating the feed stock into a light fraction comprising compounds containing five carbon atoms or less, an intermediate fraction containing largely compounds having six carbon atoms, and a heavy fraction which which comprises compounds containing more than six carbon atoms; passing the light fraction to a gasoline blending pool; treating the intermediate fraction in an isomerization zone to increase the octane number of the intermediate fraction and form an isomerate; passing the heavy fraction to the gasoline blending pool; and, passing the isomerate to the gasoline bending pool.

* * * * *